United States Patent [19]

Welsh

[11] 4,393,757
[45] Jul. 19, 1983

[54] FOOD POUCH COOKING HOLDER

[76] Inventor: Clifford W. Welsh, 1622 Sonata La., Lake San Marcus, Calif. 92069

[21] Appl. No.: 314,955

[22] Filed: Oct. 26, 1981

[51] Int. Cl.³ .............................................. A47J 37/00
[52] U.S. Cl. ......................................... 99/369; 99/413
[58] Field of Search ................. 99/403, 410, 413, 426, 99/349, 369; 134/135

[56] References Cited

U.S. PATENT DOCUMENTS

| | | | |
|---|---|---|---|
| 2,614,484 | 10/1952 | Caruso | 99/403 X |
| 3,424,076 | 1/1969 | Bernatz et al. | 99/426 X |
| 3,613,553 | 10/1971 | Popeil | 99/403 X |
| 3,819,089 | 6/1974 | Scales | 99/413 X |
| 3,858,496 | 1/1975 | Downers | 99/403 X |

FOREIGN PATENT DOCUMENTS

| | | | |
|---|---|---|---|
| 10833 | of 1904 | United Kingdom | 99/403 |
| 259783 | 10/1926 | United Kingdom | 99/413 |
| 828267 | 2/1960 | United Kingdom | 99/403 |

Primary Examiner—Billy J. Wilhite
Attorney, Agent, or Firm—Erik M. Arnhem

[57] ABSTRACT

A flat welded wire assembly has a regular shaped multiple member welded frame, and a pair of diverging securing members extending across the frame and terminating in a U-bend wire handle. Each one of the terminus of the pair of diverging members terminates in a securing hook, slidably engaging a cooking pan top rim. A slidable hook member is secured on the U-bend handle, slidably adjusting on the hook securing under the same pan top rim, providing a three-point pan rim engagement for the regular shape member welded frame at a selected depth inside the pan. The cooking pan is filled with water, and a hermetically sealed food pouch is disposed under the regular shape member frame and can be cooked over a heat source.

2 Claims, 5 Drawing Figures

FOOD POUCH COOKING HOLDER

BACKGROUND OF THE INVENTION

The food pouch cooking holder of this invention was searched in Classes 99/403, 99/426, 99/448, and 222/95.

In U.S. Pat. No. 3,858,496 issued on Jan. 7, 1975 Downer discloses a device for hanging onto the rim of a cooking vessel and suspending a member of stick carried food items, such as butter coated weiners, in a cooking medium such as frying oil.

Scales discloses in U.S. Pat. No. 3,819,089 issued June 25, 1974, a conventional food storage bag of layflat construction heat sealed at one end to form a handle, V shaped notches being formed adjacent to the handle. A bag holding and dispensing element includes a central portion having an elongated slot through which the upper, or handle end of the bag is inserted.

Further, in U.S. Pat. No. 3,613,553 issued Oct. 19, 1971, Popell discloses a hot oil bath rack for making potato puffs. The rack has a plurality of compartments to partially puff raw potato slices.

In U.S. Pat. No. 3,424,076 issued Jan. 28, 1969, Bernatz el al disclose a forming and cooking frame for a novel tortilla product, providing a conically shaped edible container.

Still further, Caruso disclosed in U.S. Pat. No. 2,614,484, issued Oct. 21, 1952 a retainer for vegetables and like products while cooking, adapted to keeping the vegetables in a submerged condition in water while cooking in a pot.

SUMMARY OF THE INVENTION

A flat, welded wire assembly has a regular geometrical shape typically circular, square, or rectangular, with an exterior wire support frame. A pair of diverging wire support frame members are disposed extending across the exterior wire frame and spot welded thereto, having a pair of free termini formed into horizontally extending hooks. The opposed pair of wire support frame members opposite the hooks are formed parallel and may be joined to form a U-bend handle. The support frame member pair are shaped at the opposed pair of termini to support the flat welded wire assembly inside a typical cooking pot of one quart to one gallon or more capacity at a desired wire assembly depth in the pot. The pair of free termini horizontal extending hooks are shaped and sized to fit under the top rim of the cooking pots. The flat wire assembly is sized and shaped to fit in a typical cooking pot at a depth of one to three inches. A slidable hook fastener is frictionally engaged to slide on the U-bend handle, the hook engaging the pot top rim on pushing the frictionally secured hook underneath the pot top rim.

In a further modification of the holder of this invention, the three hooks can be replaced by silicone rubber covered termini on the three hooks, which are resistant to the temperature of boiling water. The holder is then held on the pot by the frictional grip of these three silicone rubber tips.

In use, the pouch cooking holder is engaged on the pot of water, after the hermetically sealed cooking pouch containing food is disposed in the cooking pot. The holder retains the pouch under water, providing uniform and rapid food heating.

Included in the objects of this invention are:

To provide a holder for uniformly cooking in hot water the contents of hermetically sealed food pouches.

To provide a holder for totally maintaining sealed food pouches immersed in hot water.

To provide a simple, inexpensive holder for totally immersing sealed food pouches in hot water.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
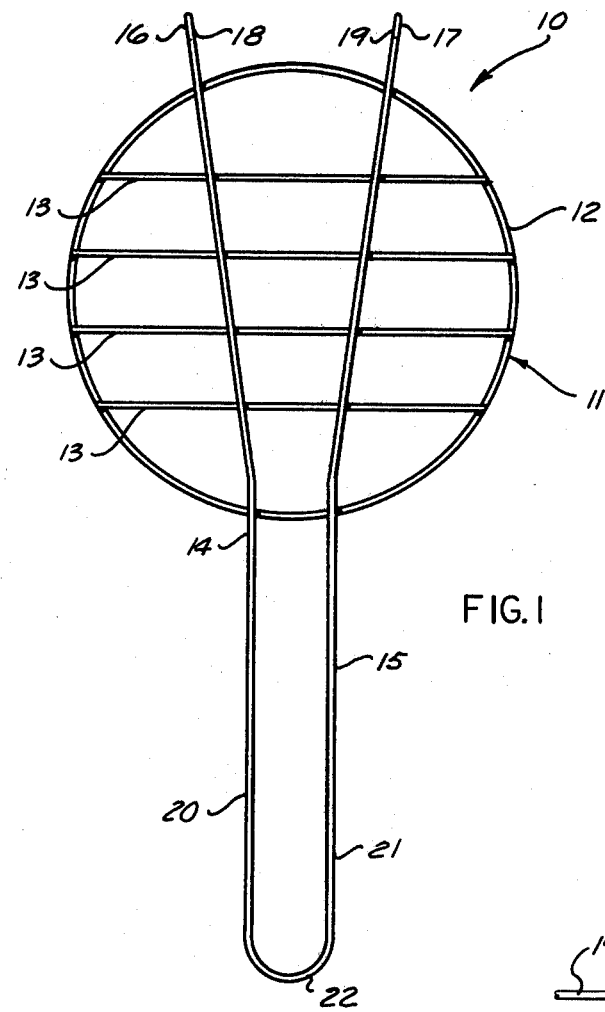
FIG. 1 is a plan view of the food pouch cooking holder of this invention.
Figure 2:
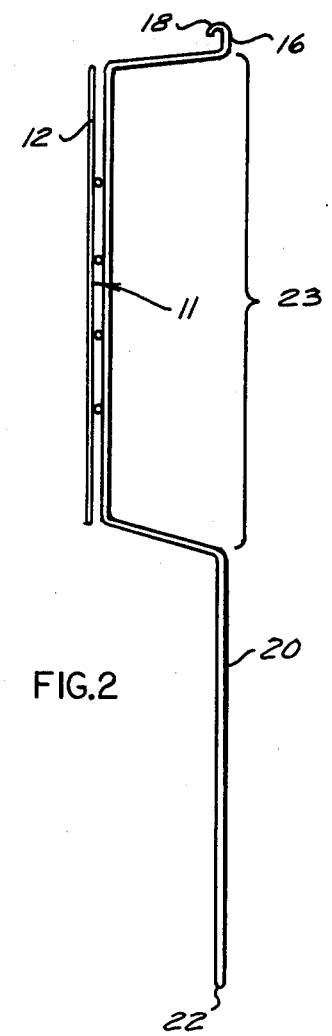
FIG. 2 is an elevational view of the food pouch cooking holder of this invention.

Referring to FIGS. 1 and 2 in detail, the food pouch cooking holder 10 has a regular shaped multiple member welded frame 11. The frame 11 as illustrated, is circular in geometrical shape, and can be square, rectangular or other regular shape, with an exterior circular support frame 12 and multiple cross frame members 13 (in the illustration four is a typical number). The collective members of frames 11, 12, and 13 are spot welded into a rigid frame 11. A pair of diverging wire support frame members 14 and 15 and disposed across the top or bottom of frame 11, having a pair of free termini 16 and 17 respectively. The termini 16 and 17 are formed into curved horizontal extending hooks 18 and 19 respectively. The hooks 18 and 19 are shaped and sized to fit under the top rim bead of a cooking pot (not shown). The opposed pair of wire support frame members 20 and 21 opposite the termini 16 and 17 are formed parallel and may be joined at 22 into a first U-bend terminus. A second U-bend 23 is formed and sized to dispose the frame 11 inside the cooking pot at the desired pot depth from the pot top rim.

Figure 3:
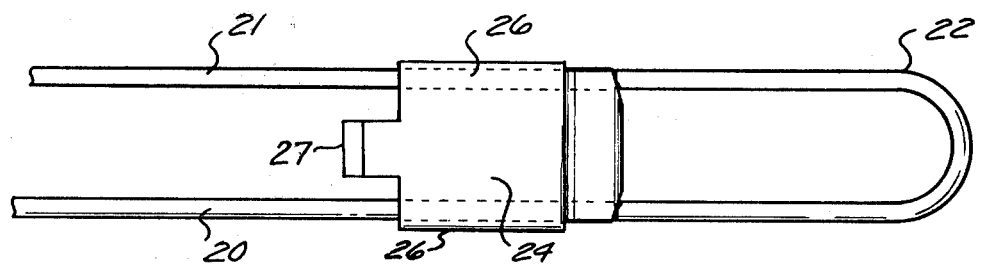
FIG. 3 is a further plan view of the slidable hook member of the holder of this invention.
Figure 4:
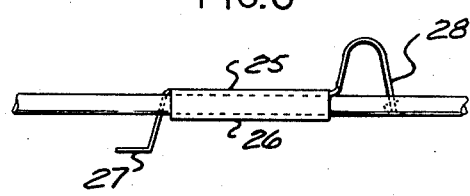
FIG. 4 is an elevational view of the hook member of FIG. 3.

In FIGS. 3 and 4 the pair of parallel wire frame members 20 and 21, have a slidable hook fastener 24 secured on the members 20 and 21, with 20 and 21 providing guide rails for 24. The fastener 24 is secured by the top 25 and the frictional clips 26 to the members 20 and 21. The third forward positioned hook 27 is an integral part of fastener 24, extends down below handle members 20 and 21, and engages the top rim of the cooking pot in a securing operation, along with the hooks 18 and 19. The rearward positioned curved pusher 28 of the fastener 24 enables the fastener 24 to be slid along the pair of members 20 and 21 by the user's thumb.

Thus the three hooks 18, 19 and 27 provide three-prong securing means for holding the frame 11 in position inside the cooking pot (not shown), by being secured to the top rim of the pot. The hooks 18, 19 and 27 resist the buoyant force of a hermetically sealed food pouch disposed in the pot of hot or boiling water, when the pouch is placed under frame 11.

Figure 5:
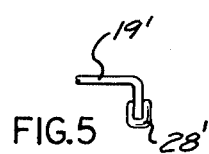
FIG. 5 is a sectional view of the silicone tip modified securing means of this invention.

A further modification of the holder 10 embodies frictional securing members in which the straight members are coated with a frictional covering of a soft, silicone heat resisting rubber 28' as in FIG. 5. The silicone rubber typical tip 28' will grip the pot exterior, securing the holder 10 in place against the buoyant pouch forces.

The cooking holder can be adaptively sized and shaped for cooking pots ranging typically from 1 quart to 5 gallons, or the like, shaped at the second U-bend 23 to fit a desired pot size, providing hot water immersion for a suitable pouch size.

The holder 10 can have members spot welded, hard soldered, or soft soldered together, as desired. Spot welding is typical. The members of the holder 10 can be steel (stainless or tinned), aluminum, or nickel as desired. The holder 10 is sized as required for a specific cooking pot size.

Many modifications in the food pouch cooking holder can be made in the light of my teachings. It is understood that within the scope of the claims, the invention can be practiced otherwise than as described.

I claim:

1. A food pouch cooking holder suitable for cooking in pots of hot water, comprising:

a regular shaped, multiple wire member welded flat frame having an exterior frame of regular shape and multiple cross frame members permanently secured together, a pair of diverging wire support frame members disposed fully across the regular shaped flat frame and permanently secured thereto, said diverging pair of frame members having a pair of free termini projecting beyond one exterior frame edge, and a second pair of termini formed in parallel and projecting beyond the opposed second exterior frame edge and having a first U-bend terminus, a pair of curved horizontal extending securing means formed on the pair of first termini of aforesaid pair of diverging wire support frame members, said pair of securing means adapted to be secured to the top rim of a cooking pot, a slidable, frictionally secured fastener disposed on aforesaid second pair of termini disposed in parallel, said fastener having a forward positioned securing means engagable with said cooking pot top rim, and a rearward positioned pusher means, said fastener providing a third securing means securing said cooking holder on said cooking pot, said pair of diverging wire support frame members also disposed in a second U-bend, adapted and sized to provide a required depth of immersion of said regular shaped, multiple wire frame inside of said cooking pot, and, said cooking holder capable of securing in said cooking pot and securing a cooking food pouch under said holder in water during a cooking time period.

2. A food pouch cooking holder suitable for cooking in pots of hot water, comprising:

a regular shaped, multiple wire member welded flat frame having an exterior frame of regular shape and multiple cross frame members permanently secured together, a pair of diverging wire support frame members disposed fully across the regular shaped flat frame and permanently secured thereto, said diverging pair of frame members having a pair of free termini projecting beyond one exterior frame edge, and a second pair of termini formed in parallel and projecting beyond the opposed second exterior frame edge and having a first U-bend terminus, a pair of curved horizontal extending hooks formed on the pair of first termini of aforesaid pair of diverging wire support frame members, said pair of hooks adapted to be secured to under the top rim of a cooking pot, a slidable, frictionally secured fastener disposed on aforesaid second pair of termini disposed in parallel, said fastener having a forward positioned hook engageable with said cooking pot top rim, and a rearward positioned pusher means, said fastener providing a third hook securing said cooking holder on said cooking pot, said pair of diverging wire support frame members also disposed in a second U-bend, adapted and sized to provide a required depth of immersion of said regular shaped, multiple wire frame inside of said cooking pot, and, said cooking holder capable of securing in said cooking pot and securing a cooking food pouch under said holder in water during a cooking time period.

* * * * *